(12) United States Patent
Kolagunda et al.

(10) Patent No.: US 10,776,609 B2
(45) Date of Patent: Sep. 15, 2020

(54) METHOD AND SYSTEM FOR FACIAL RECOGNITION

(71) Applicant: Samsung Electronics Co., Ltd., Suwon-si, Gyeonggi-do (KR)

(72) Inventors: Abhishek Kolagunda, Newark, DE (US); Xiaolong Wang, Sunnyvale, CA (US); Serafettin Tasci, Sunnyvale, CA (US); Dawei Li, Sunnyvale, CA (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 135 days.

(21) Appl. No.: 15/905,609

(22) Filed: Feb. 26, 2018

(65) Prior Publication Data

US 2019/0266388 A1     Aug. 29, 2019

(51) Int. Cl.
*G06K 9/00* (2006.01)
*G06T 17/10* (2006.01)

(52) U.S. Cl.
CPC ..... *G06K 9/00281* (2013.01); *G06K 9/00906* (2013.01); *G06T 17/10* (2013.01)

(58) Field of Classification Search
None
See application file for complete search history.

(56) References Cited

U.S. PATENT DOCUMENTS

| | | |
|---|---|---|
| 8,457,367 B1 | 6/2013 | Sipe et al. |
| 8,675,926 B2 | 3/2014 | Zhang et al. |
| 8,856,541 B1 | 10/2014 | Chaudhury et al. |
| 9,202,119 B2 | 12/2015 | Jacques et al. |
| 2008/0192980 A1 | 8/2008 | Park et al. |
| 2011/0164792 A1 | 7/2011 | Yoon et al. |

(Continued)

FOREIGN PATENT DOCUMENTS

| | | |
|---|---|---|
| CN | 101894254 B | 6/2010 |
| CN | 101976339 B | 11/2010 |

(Continued)

OTHER PUBLICATIONS

Wang, T. et al., "Face liveness detection using 3D structure recovered from a single camera," 2013 International Conference on Biometrics (ICB), Madrid, 2013, pp. 1-6, doi: 10.1109/ICB.2013.6612957.

(Continued)

*Primary Examiner* — Leon Viet Q Nguyen
(74) *Attorney, Agent, or Firm* — Sherman IP LLP; Kenneth L. Sherman; Hemavathy Perumal

(57) ABSTRACT

One embodiment provides a method for face liveness detection. The method comprises receiving a first image comprising a face of a user, determining one or more two-dimensional (2D) facial landmark points based on the first image, and determining a three-dimensional (3D) pose of the face in the first image based on the one or more determined 2D facial landmark points and one or more corresponding 3D facial landmark points in a 3D face model for the user. The method further comprises determining a homography mapping between the one or more determined 2D facial landmark points and one or more corresponding 3D facial landmark points that are perspectively projected based on the 3D pose, and determining liveness of the face in the first image based on the homography mapping.

20 Claims, 7 Drawing Sheets

(56) References Cited

U.S. PATENT DOCUMENTS

| | | | | |
|---|---|---|---|---|
| 2014/0043329 | A1* | 2/2014 | Wang | G06T 17/20 |
| | | | | 345/420 |
| 2015/0009207 | A1* | 1/2015 | Guo | G06T 15/00 |
| | | | | 345/419 |
| 2016/0210500 | A1* | 7/2016 | Feng | G06T 19/20 |
| 2016/0379047 | A1* | 12/2016 | Natan | G06K 9/00281 |
| | | | | 382/201 |
| 2017/0039761 | A1 | 2/2017 | Zhang et al. | |
| 2017/0053435 | A1* | 2/2017 | Reymann | G07C 9/00563 |
| 2017/0169303 | A1* | 6/2017 | Connell, II | G06K 9/00899 |

FOREIGN PATENT DOCUMENTS

| | | |
|---|---|---|
| CN | 101923641 B | 8/2012 |
| CN | 104915649 A | 6/2015 |
| CN | 105205455 A | 8/2015 |
| CN | 105590097 A | 5/2016 |
| EP | 3020023 B1 | 9/2017 |
| WO | 2017025573 A1 | 2/2017 |
| WO | 2018017319 A1 | 1/2018 |

OTHER PUBLICATIONS

Chakraborty, S., et al. "An Overview of Face Liveness Detection," International Journal on Information Theory (IJIT), Apr. 2014, pp. 11-25, vol. 3, No. 2, arXiv.org, United States.

Ramachandra, R., et al., "Presentation Attack Detection Methods for Face Recognition Systems—A Comprehensive Survey," ACM Computing Surveys, 2017, pp. 1-41, vol. 0, No. 0, United States.

Patel, K. et al., "Secure Face Unlock: Spoof Detection on Smartphones," IEEE Transactions on Information Forensics and Security, Oct. 2016, pp. 2268-2283, vol. 11, No. 10, IEEE, United States.

Patel, K. et al., "Live Face Video vs. Spoof Face Video: Use of Moiré Patterns to Detect Replay Video Attacks," Biometrics (ICB), 2015, pp. 1-8, IEEE, United States.

Wen, D., et al., "Face Spoof Detection With Image Distortion Analysis," IEEE Transactions on Information Forensics and Security, Apr. 2015, pp. 746-761, vol. 10, issue 4, IEEE, United States {Abstract Only}.

Kim, W., et al., "Face liveness detection from a single image via diffusion speed model," IEEE Transactions on Image Processing, Aug. 2015, pp. 2456-2465, vol. 24, issue 8, IEEE, United States {Abstract Only}.

Alotaibi, A. et al., "Enhancing computer vision to detect face spoofing attack utilizing a single frame from a replay video attack using deep learning," 2016 International Conference on Optoelectronics and Image Processing (ICOIP), Jun. 2016, IEEE, United States {Abstract Only}.

International Search Report and Written Opinion dated Jun. 11, 2019 for International Application PCT/KR2019/002317 from Korean Intellectual Property Office, pp. 1-8, Republic of Korea.

* cited by examiner

METHOD AND SYSTEM FOR FACIAL RECOGNITION

TECHNICAL FIELD

One or more embodiments relate generally to facial recognition, and in particular, a method and system for detecting a presentation attack via a facial recognition system.

BACKGROUND

Facial recognition (i.e., face recognition) generally refers to a method of identifying a user by comparing a live capture or digital image data against one or more stored records for the user. Facial recognition is becoming a popular way to control user access to devices, locations, and services. For example, facial recognition systems are widely used for biometric authentication in our daily lives. Such systems, however, are highly vulnerable to various types of spoofing attacks.

SUMMARY

One embodiment provides a method for face liveness detection. The method comprises receiving a first image comprising a face of a user, determining one or more two-dimensional (2D) facial landmark points based on the first image, and determining a three-dimensional (3D) pose of the face in the first image based on the one or more determined 2D facial landmark points and one or more corresponding 3D facial landmark points in a 3D face model for the user. The method further comprises determining a homography mapping between the one or more determined 2D facial landmark points and one or more corresponding 3D facial landmark points that are perspectively projected based on the 3D pose, and determining liveness of the face in the first image based on the homography mapping.

These and other features, aspects and advantages of the one or more embodiments will become understood with reference to the following description, appended claims and accompanying figures.

DETAILED DESCRIPTION

Figure 1:
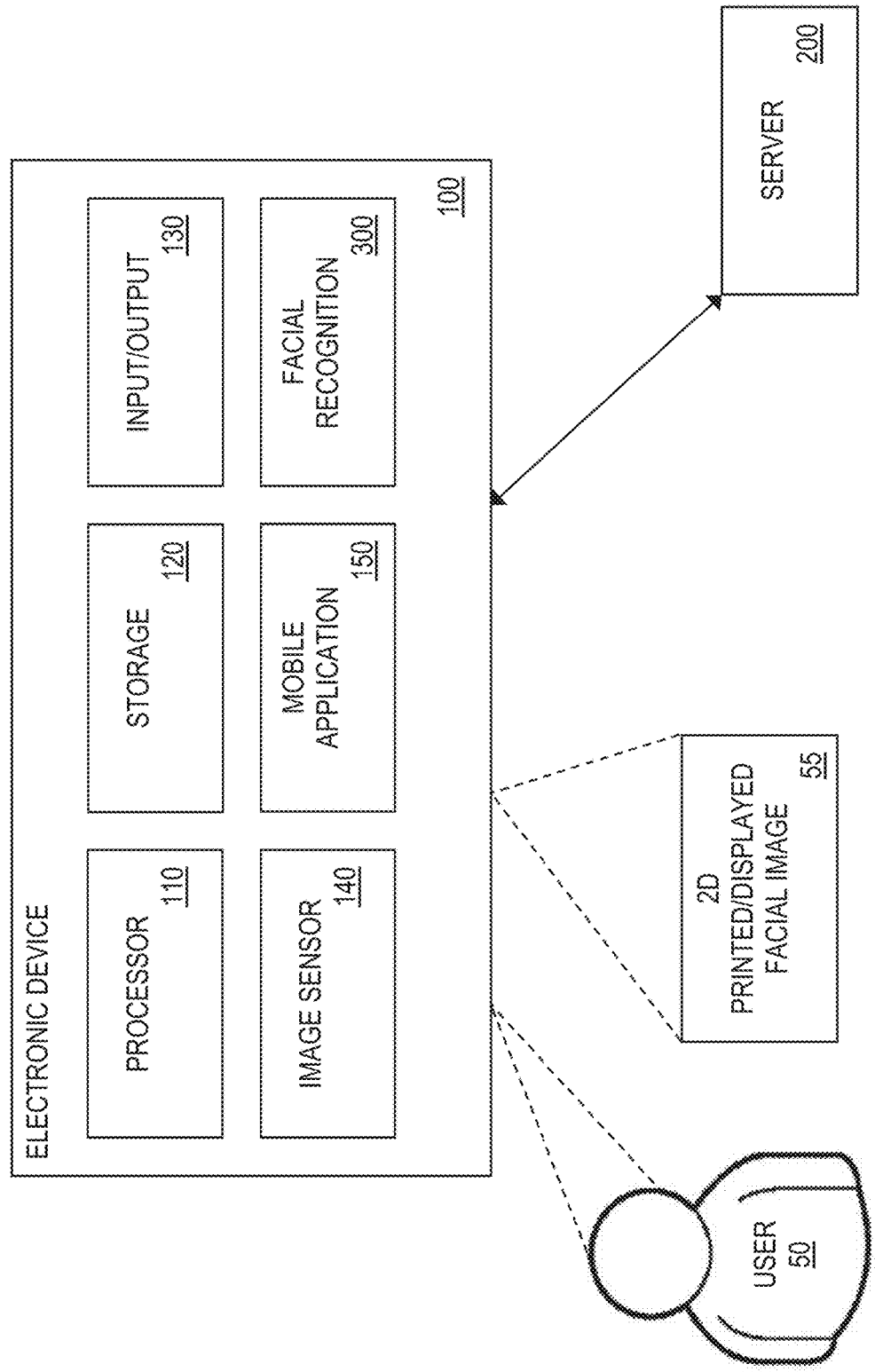
FIG. 1 illustrates an example computing architecture for implementing a facial recognition system, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

In this specification, the term "presentation attack" is used to generally refer to a method of spoofing (i.e., a spoofing attack) involving presenting a two-dimensional (2D) image of a face of a user to an image sensor (e.g., a camera) utilized by a facial recognition system. The 2D image may be presented to the image sensor using a printed medium (e.g., a printed photograph) or a display device (e.g., a mobile device, such as a smartphone, a tablet, etc.). For example, an attacker may obtain a portrait picture of a user, print/display the picture on a planar surface (i.e., a printed medium or a display device), and present the planar surface to the image sensor.

In this specification, the term "face liveness detection" is used to generally refer to a process of determining whether an object presented to an image sensor (e.g., a camera) utilized by a facial recognition system is a real three-dimensional (3D) face of a user (e.g., the user is standing in front of the image sensor) or a 2D facial image of the user (e.g., the 2D facial image is presented to the image sensor using a printed medium or a display device as part of a presentation attack).

One or more embodiments relate generally to facial recognition, and in particular, a method and system for detecting a presentation attack via a facial recognition system. One embodiment provides a method for face liveness detection. The method comprises receiving a first image comprising a face of a user, determining one or more two-dimensional (2D) facial landmark points based on the first image, and determining a three-dimensional (3D) pose of the face in the first image based on the one or more determined 2D facial landmark points detected and one or more corresponding 3D facial landmark points in a 3D face model for the user. The method further comprises determining a homography mapping between the one or more determined 2D facial landmark points and one or more corresponding 3D facial landmark points that are perspectively projected based on the 3D pose, and determining liveness of the face in the first image based on the homography mapping.

Conventional methods for face liveness detection utilize multiple images of a user with different 3D pose variations to determine whether a face presented to an image sensor of a facial recognition system is a real 3D face or a 2D facial image printed/displayed on a planar surface, such as a printed medium or a display device. Such conventional methods involve determining scene geometry by tracking key points (e.g., 2D facial landmark points) in multiple images. Such conventional methods affect usability of facial recognition systems as they require more user actions (e.g., multiple images of a user are required).

One embodiment provides a facial recognition system configured to detect a presentation attack by determining whether an object (e.g., a face of an actual, live user, a printed photograph, etc.) presented to an image sensor utilized by the system has a 2D planar surface (e.g., the object is a 2D printed/displayed image presented to the camera using a printed medium or a display device) or a live 3D surface (e.g., the object is an actual 3D face of a user positioned within proximity of the image sensor). In one embodiment, the system is configured to perform at least one of the following: (1) 3D shape construction from multiple views, (2) image sensor calibration using a planar calibration object, (3) determining 2D facial landmark points, (4) 3D pose estimation, and (5) determining a homography mapping that maps facial landmark points on one plane to another. The system is configured to detect spoofing attacks such as presentation attacks using a known 3D facial shape of a user and a calibrated image sensor to determine scene and image sensor geometry. In one embodiment, the system is configured to perform face liveness detection based on a single image captured by the image sensor and one or more camera intrinsic parameters for the image sensor. Unlike conventional methods, the system does not require capture of multiple facial images with 3D pose variations to detect a presentation attack, thereby reducing turnaround time.

FIG. 1 illustrates an example computing architecture 10 for implementing a facial recognition system 300, in one or more embodiments. The computing architecture 10 comprises an electronic device 100 including computation resources, such as one or more processors 110 and one or more storage units 120. One or more applications may execute/operate on the electronic device 100 utilizing the computation resources of the electronic device 100.

Examples of an electronic device 100 include, but are not limited to, a desktop computer, a mobile electronic device (e.g., a tablet, a smart phone, a laptop, etc.), or a consumer product such as a smart television, a smart car, or any other product utilizing facial recognition for authentication.

In one embodiment, the electronic device 100 comprises an image sensor 140 integrated in or coupled to the electronic device 100, such as a camera. One or more applications on the electronic device 100 may utilize the image sensor 140 to capture an image of an object presented to the image sensor 140.

In one embodiment, the applications on the electronic device 100 include, but are not limited to, a facial recognition system 300 configured to perform at least one of the following: (1) receive an image of an object, and in one embodiment the object is presented to the image sensor 140, (2) perform facial verification to verify that the image received and stored records for a registered user capture the same user, and (3) perform face liveness detection to determine whether the object is a real 3D face of a user 50 or a 2D facial image printed/displayed 55 on a planar surface, such as a printed medium (e.g., a printed photograph) or a display device (e.g., a mobile device, such as a smartphone, a tablet, etc.).

In one embodiment, the applications on the electronic device 100 may further include one or more software mobile applications 150 loaded onto or downloaded to the electronic device 100, such as a mobile banking application. A software mobile application 150 on the electronic device 100 may exchange data with the facial recognition system 300. For example, a mobile banking application may invoke the facial recognition system 300 to verify an identity of a user when the user logins to the mobile banking application.

In one embodiment, the electronic device 100 may further include one or more additional sensors, such as a microphone, a GPS, or a depth sensor. A sensor of the electronic device 100 may be utilized to capture content and/or sensor-based contextual information. For example, the facial recognition system 300 and/or a software mobile application 150 may utilize the one or more additional sensors of the electronic device 100 to capture content and/or sensor-based contextual information, such as a microphone for audio data (e.g., voice recordings), a GPS for location data (e.g., location coordinates), or a depth sensor for a shape of an object presented to the image sensor 140.

In one embodiment, the electronic device 100 comprises one or more input/output (I/O) units 130 integrated in or coupled to the electronic device 100, such as a keyboard, a keypad, a touch interface, or a display screen.

In one embodiment, the electronic device 100 is configured to exchange data with one or more remote servers 200 or remote electronic devices over a connection (e.g., a wireless connection such as a WiFi connection or a cellular data connection, a wired connection, or a combination of the two). For example, a remote server 200 may be an online platform for hosting one or more online services (e.g., an online banking service) and/or distributing one or more software mobile applications 150.

In one embodiment, the computing architecture 10 is a centralized computing architecture. In another embodiment, the computing architecture 10 is a distributed computing architecture.

Figure 2:
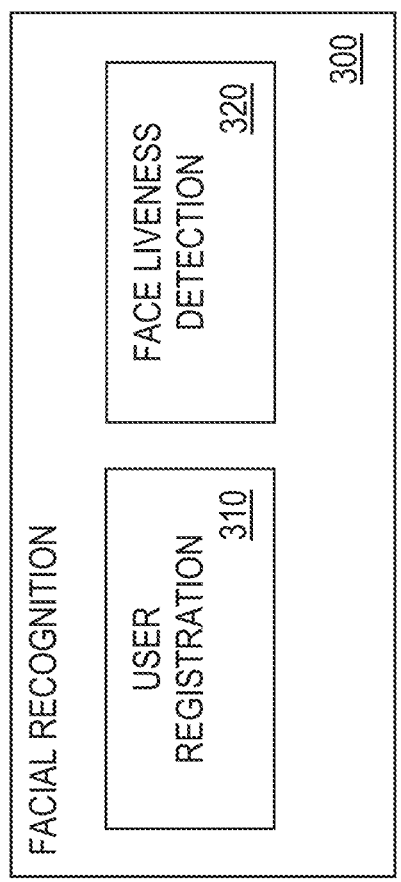
FIG. 2 illustrates the facial recognition system in detail, in one or more embodiments.

FIG. 2 illustrates the facial recognition system 300 in detail, in one or more embodiments. In one embodiment, the facial recognition system 300 utilizes the image sensor 140 to capture an image of an object presented to the image sensor 140. The image sensor 140 may be invoked to capture an image of an object by the facial recognition system 300 and/or a software mobile application 150 on the electronic device 100.

In one embodiment, the facial recognition system 300 has at least two different operating phases (i.e., modes)—a registration (i.e., setup) phase and a recognition phase. As described in detail later herein, the registration phase involves performing at least one of the following: (1) calibration of the image sensor 140, and (2) registration of a new user with the facial recognition system 300 using multiple images of the user at different 3D poses. In one embodiment, the facial recognition system 300 comprises a user registration system 310 configured to perform the registration phase.

In one embodiment, the registration phase is performed once for each user.

In one embodiment, the registration phase may take place offline (i.e., not on the electronic device 100). For example, in one embodiment, the registration phase may take place utilizing a remote server 200 or a remote electronic device.

As described in detail later herein, the recognition phase involves performing at least one of the following: (1) facial verification based on a single image captured by the image sensor 140, and (2) face liveness detection based on the single image. By requiring only a single image for face liveness detection, the facial recognition system 300 removes the need for an expensive sensor to capture a 3D shape of an object presented to the image sensor 140 during the recognition phase.

In one embodiment, the facial recognition system 300 comprises a face liveness detection system 320 configured to perform the recognition phase.

In one embodiment, the recognition phase is executed each time the image sensor 140 captures an image of an object presented to the image sensor 140 for facial recognition.

In one embodiment, the recognition phase may take place online (i.e., on the electronic device 100).

Figure 3:
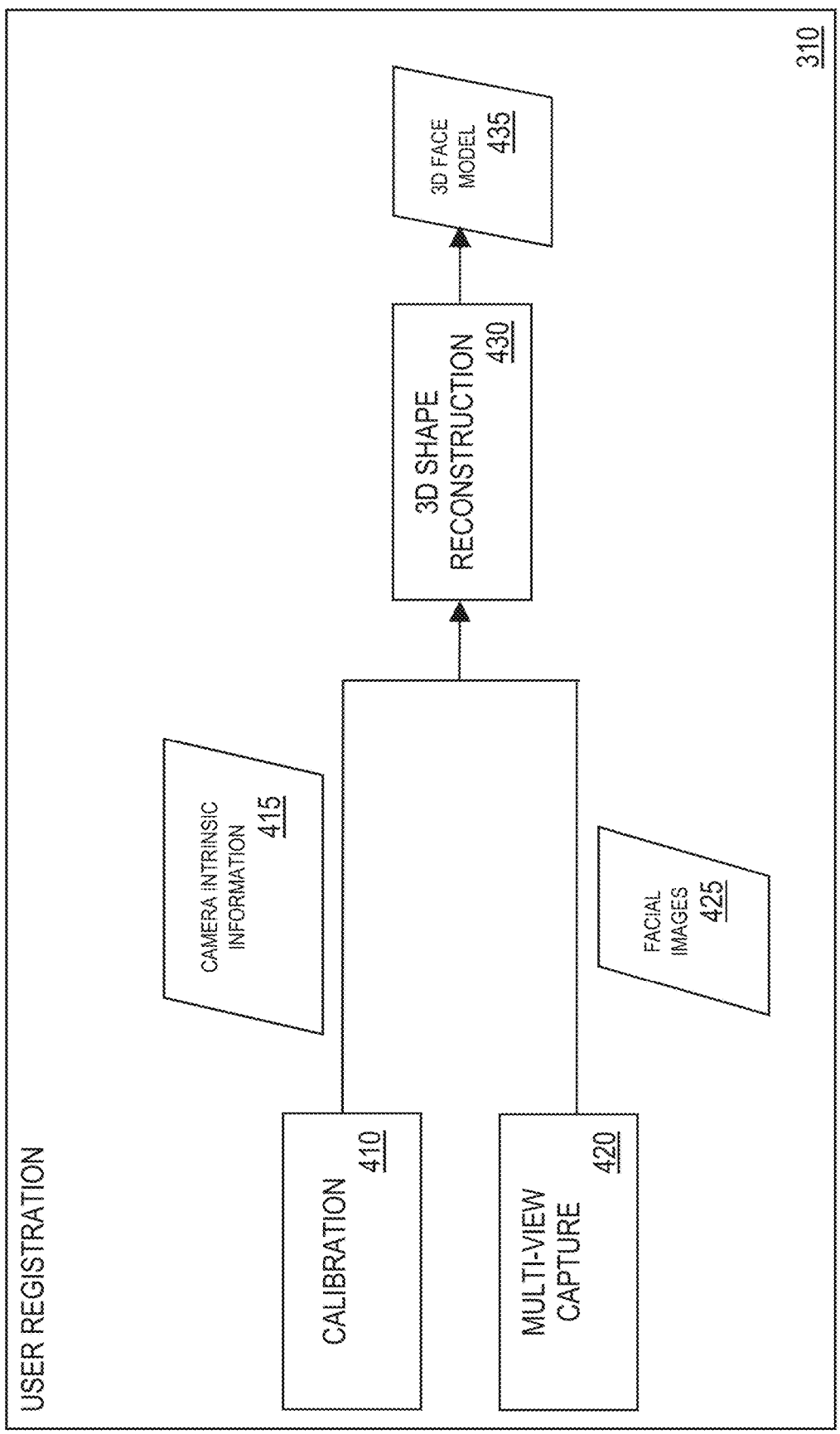
FIG. 3 illustrates one or more components of a user registration system, in one or more embodiments.

FIG. 3 illustrates one or more components of a user registration system 310, in one or more embodiments. In this specification, the term "camera intrinsic parameter" generally refers to a parameter for an image sensor (e.g., a camera), wherein the parameter is associated with an image formation process. Examples of different camera intrinsic parameters include, but are not limited to, focal length, center of projection, radial distortion, etc. In this specification, the term "camera intrinsic matrix" generally refers to a matrix representing one or more camera intrinsic parameters for an image sensor.

In one embodiment, the user registration system 310 comprises a calibration unit 410. In the registration phase, the calibration unit 410 is configured to: (1) perform a calibration of the image sensor 140 of the electronic device 100, and (2) based on the calibration, generate camera intrinsic information 415 comprising one or more camera intrinsic parameters for the image sensor 140. In one embodiment, the calibration performed by the calibration unit 410 involves utilizing the image sensor 140 to capture multiple images of a planar calibration object (e.g., a checker board, etc.) at different 3D poses. The camera intrinsic information 415 may be stored on the one or more storage units 120 of the electronic device 100 as stored records for the image sensor 140.

In one embodiment, the image sensor 140 needs only be calibrated once if the image sensor 140 is a fixed focal length camera.

In one embodiment, the user registration system 310 comprises a multi-view capture unit 420 configured to receive a request to register a user with the facial recognition system 300, wherein the request includes multiple facial images 425 of the user at different 3D poses. In one embodiment, the multiple facial images 425 may be captured using the image sensor 140 or a different image sensor (e.g., a camera on a remote electronic device). The multiple facial images 425 may be stored on the one or more storage units 120 of the electronic device 100 as stored records for the registered user.

In one embodiment, the user registration system 310 comprises a 3D shape reconstruction unit 430 configured to generate a 3D face model (i.e., structure, shape) 435 of a face of a user using motion techniques. Specifically, the 3D shape reconstruction unit 430 is configured to: (1) receive camera intrinsic information 415 for the image sensor 140 from the calibration unit 410, (2) receive multiple facial images 425 of the user at different 3D poses from the multi-view capture unit 420, (3) determine/identify and track 2D facial landmark points in the multiple facial images 425, and (4) generate a corresponding 3D face model 435 for the user by recovering/reconstructing a 3D shape of the face of the user based on the determined 2D facial landmark points and the camera intrinsic information 415. The corresponding 3D face model 435 may be stored on the one or more storage units 120 of the electronic device 100 as stored records for the registered user. The corresponding 3D face model 435 may include one or more labeled 3D facial landmark points that are reconstructed from the determined 2D facial landmark points in the multiple facial images 425. As described in detail later herein, the corresponding 3D face model 435 generated during the registration phase may be utilized during the recognition phase.

In one embodiment, a 3D face model 435 for a user may be formed using sensor-based contextual information captured using one or more depth sensors of the electronic device 100 or a remote electronic device.

Figure 4:
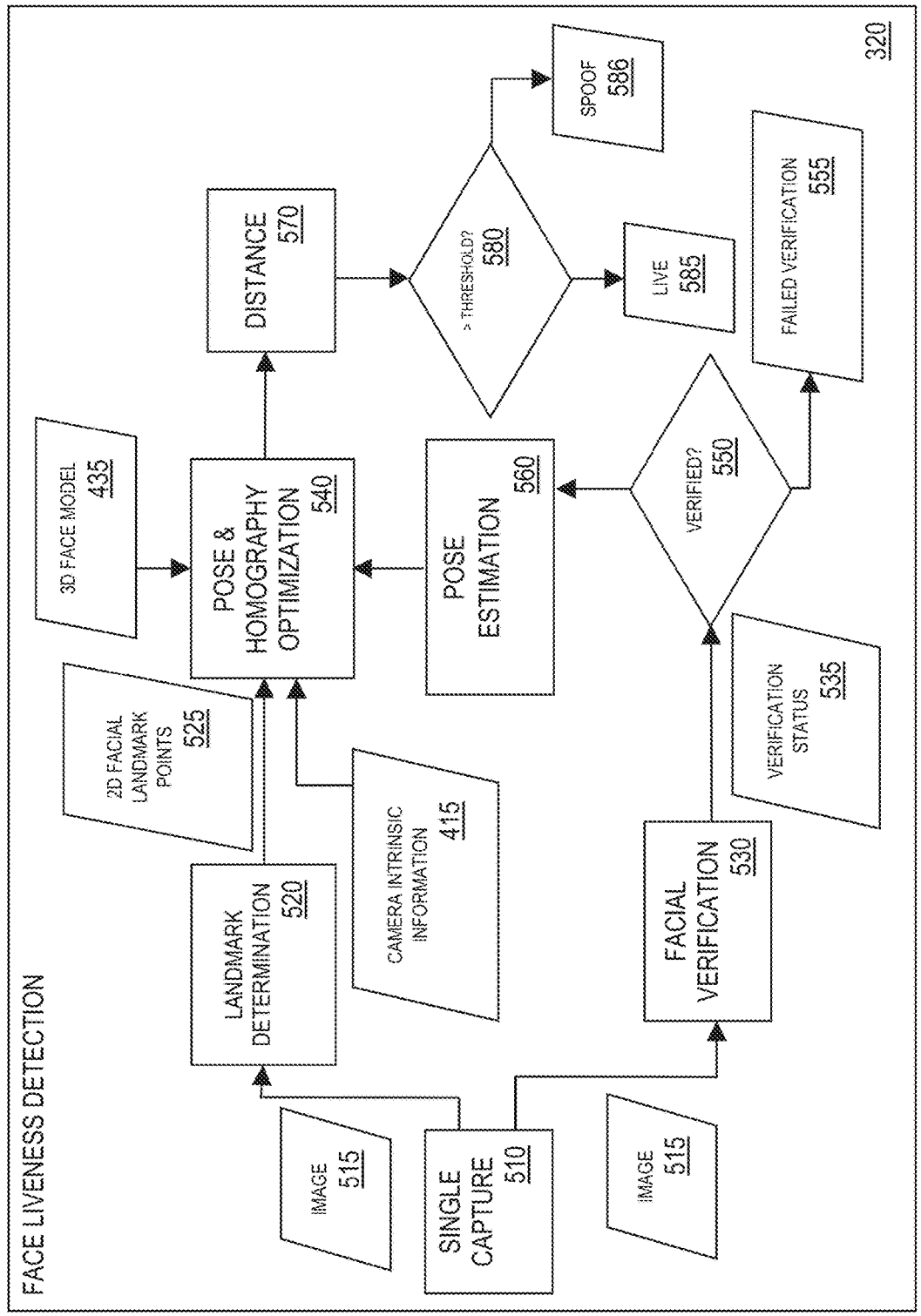
FIG. 4 illustrates one or more components of a face liveness detection system, in one or more embodiments.

FIG. 4 illustrates one or more components of a face liveness detection system 320, in one or more embodiments. In this specification, term "query image" generally refers to a single image of an object presented to the image sensor 140 during the recognition phase, wherein the query image is captured/formed by the image sensor 140 and forwarded to the facial recognition system 300 for facial recognition.

In one embodiment, the face liveness detection system 320 comprises a single capture unit 510 configured to receive a request for facial recognition of an object presented to the image sensor 140. In one embodiment, the request is received from at least one of a software mobile application 150 on the electronic device 100, a remote server 200, or a remote electronic device. The request includes a query image 515 of the object, wherein the query image 515 is captured by the image sensor 140.

In one embodiment, the face liveness detection system 320 comprises a landmark determination unit 520 configured to: (1) receive a query image 515 of an object from the single capture unit 510, and (2) determine/identify 2D facial landmark points 525 in the query image 515. In one embodiment, the determined 2D facial landmark points 525 are represented as coordinates relative to the query image 515 ("image coordinates").

In one embodiment, the face liveness detection system 320 comprises a facial verification unit 530 configured to: (1) receive a query image 515 of an object from the single capture unit 510, (2) perform facial verification based on the query image 515, and (3) generate a verification status 535 indicative of a result of the facial verification. In one embodiment, the facial verification unit 530 performs facial verification by comparing the query image 515 against stored records for a registered user (e.g., facial images captured during the registration phase and stored on the one or more storage units 120) to determine if the query image 515 and the stored records capture the same user. In one embodiment, the verification status 535 is one of the following: (1) a positive verification status indicating that a user captured in the query image 515 is verified (i.e., the user is a registered user), or (2) a negative verification status indicating that the user captured in the query image 515 is not verified (i.e., the user is not a registered user).

In one embodiment, the face liveness detection system 320 comprises a 3D pose estimation unit 560 configured to determine an estimated 3D pose of a face of a user captured in a query image 515.

In one embodiment, the face liveness detection system 320 comprises a first control unit 550 configured to control whether face liveness detection should be performed or bypassed based on a result of facial verification performed on a query image 515. Specifically, in response to receiving a negative verification status from the facial verification unit 530, the first control unit 550 bypasses face liveness detection and generates a failed verification report 555 indicating that a user captured in the query image 515 is not verified (i.e., not a registered user). In response to receiving a positive verification status 535 from the facial verification unit 530, the first control unit 550 proceeds with face liveness detection by invoking the 3D pose estimation unit 560 to determine an estimated 3D pose of a face of a user captured in the query image 515.

In one embodiment, the face liveness detection system 320 comprises a 3D pose and homography optimization unit 540 configured to receive, as inputs, each of the following: (1) a 3D face model 435 corresponding to a user captured in a query image 515 (e.g., a 3D face model 435 generated during the registration phase and stored on the one or more storage units 120), (2) camera intrinsic information 415 for the image sensor 140 (e.g., camera intrinsic information 415 generated during the registration phase and stored on the one or more storage units 120), (3) determined 2D facial landmark points 525 in the query image 515 (e.g., determined 2D facial landmark points 525 from the landmark determination unit 520), and (4) an estimated 3D pose of a face of a user captured in the query image 515 (e.g., an estimated 3D pose from the 3D pose estimation unit 560).

In one embodiment, each registered user has a corresponding 3D face model 435 of his/her face captured and stored during the registration phase. If the face liveness detection system 320 generates, in response to receiving a query image 515, a positive verification status indicating that a user captured in the query image 515 is verified (i.e., the user is a registered user), the face liveness detection system 320 retrieves a 3D face model 435 corresponding to the user (e.g., from the one or more storage units 120).

The 3D pose and homography optimization unit 540 is further configured to: (1) determine correspondences between the determined 2D facial landmark points 525 in the query image 515 and labeled 3D facial landmark points in the 3D face model 435, (2) generate a first image of 2D facial landmark points by multiplying the determined 2D facial landmark points 525 with an inverse of a camera intrinsic matrix included in the camera intrinsic information 415 to transform the determined 2D facial landmark points 525 in image coordinates to coordinates relative to a homogenous camera ("homogenous camera coordinates"), (3) generate a second image of 3D facial landmark points by perspective projection of corresponding 3D facial landmark points based on the estimated 3D pose, and (4) jointly optimize via iterative refinement the estimated 3D pose and a homography mapping between the first image and the second image to reduce or minimize a distance between 2D facial landmark points in the first image and corresponding perspectively projected 3D landmarks points in the second image. In one embodiment, the 3D pose and homography optimization unit 540 is further configured to determine the homography mapping by decomposing the homography mapping based on one or more camera intrinsic parameters for the image sensor 140.

In one embodiment, the face liveness detection system 320 further comprises: (1) a distance unit 570 configured to determine a distance between the homography mapping and an identity matrix representing an identity transform, and (2) a comparison unit 580 configured to compare the distance between the homography mapping and the identity matrix against a pre-determined threshold. In one embodiment, if the distance between the homography mapping and the identity matrix exceeds the pre-determined threshold, the comparison unit 580 determines that the object presented to the image sensor 140 has a planar 2D surface, and generates a failed face liveness detection report 586 indicating that the object is a 2D printed/displayed facial image 55 that may have been presented to the image sensor 140 as part of a presentation attack (i.e., the object is a spoof). If the distance between the homography mapping and the identity matrix does not exceed the pre-determined threshold, the comparison unit 580 determines that the object has a live 3D surface, and generates a successful face liveness detection report 585 indicating that the object is a real 3D face (i.e., the object is live). In one embodiment, the homography mapping is the same as the identify matrix if the object is a real 3D face that is presented to the image sensor 140 at a particular scale and a particular distance. Therefore, the face liveness detection system 320 is configured to detect whether the image sensor 140 forms the query image 515 from an actual 3D object or a 2D image of the object.

In one embodiment, the face liveness detection system 320 is configured to perform face liveness detection based on a sequence of images captured utilizing the image sensor 140. The face liveness detection system 320 aggregates results and makes a final determination as to whether an object presented to the image sensor 140 is live is based on the aggregated results.

Figure 5:
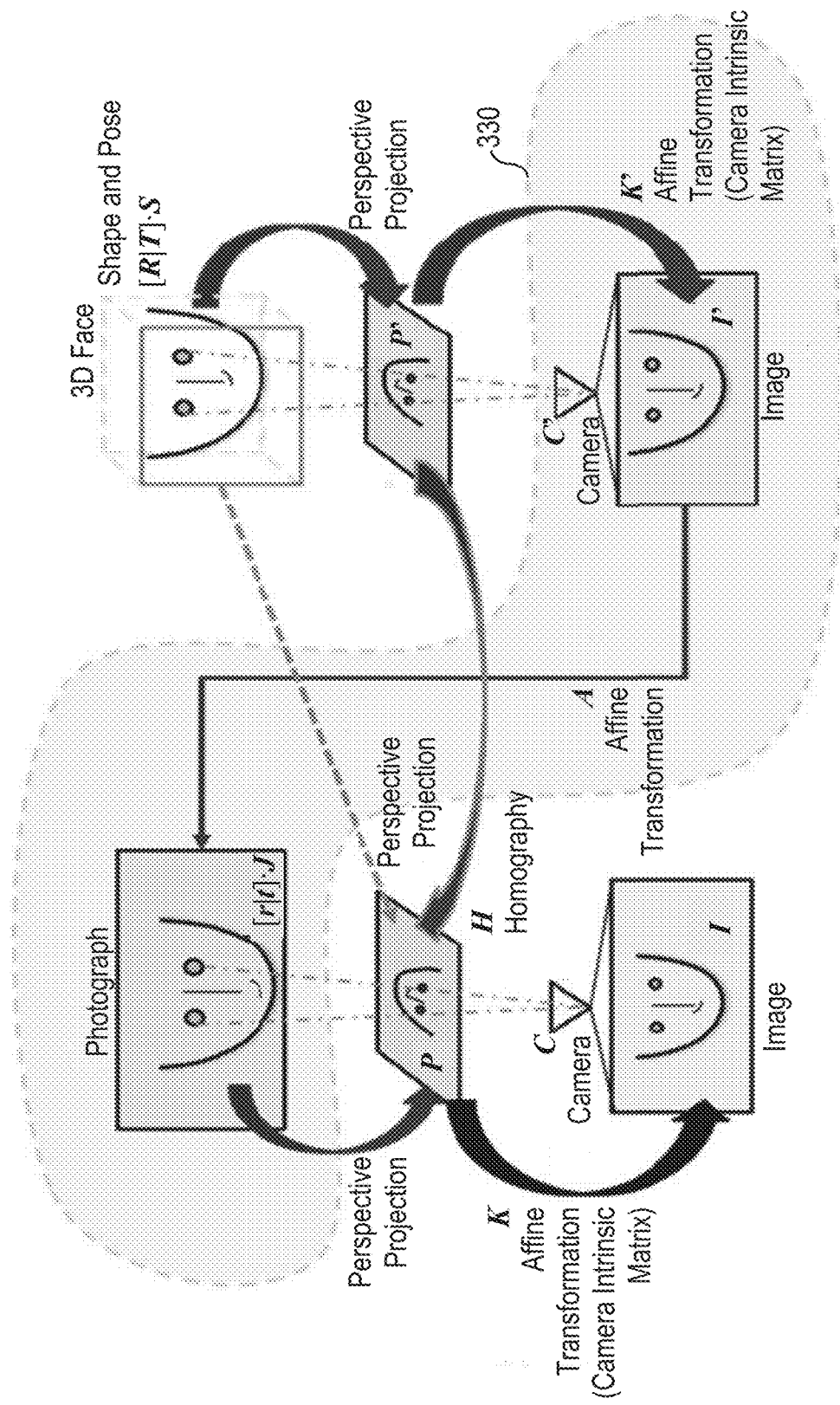
FIG. 5 illustrates a face liveness detection process performed by the face liveness detection system, in one or more embodiments.

FIG. 5 illustrates a face liveness detection process performed by the face liveness detection system 320, in one or more embodiments. Assume an image sensor C' used to capture a real 3D face of a user. The face of the user has a 3D shape (i.e., model, structure) S and a 3D pose [R|T] relative to the image sensor C'. In one embodiment, the 3D shape S of the face of the user is known to the facial recognition system 300. For example, in one embodiment, one or more components of the facial recognition system 300 (e.g., the calibration unit 410, the multi-view capture unit 420, and the 3D shape reconstruction unit 430) are configured to determine/acquire the 3D shape S of the face of the user when the user registers with the facial recognition system 300 during the registration phase.

The image sensor C' forms a 2D image I' of the face of the user via multiple transformations including: (1) a perspective projection of the shape S onto a perspective projection plane P', and (2) an affine transformation K' by multiplying the perspective projection by a camera intrinsic matrix K' for the image sensor C'. An attacker may produce a 2D photograph J of the face of the user to use during a presentation attack by printing/displaying the 2D image I' onto a printed medium or a display device, such that the 2D image I' undergoes another affine transformation A.

Assume an image sensor C is used by a facial recognition system to capture an object presented to the facial recognition system for facial recognition (e.g., the image sensor 140 of the facial recognition system 300). Assume an attacker presents the 2D photograph J to the image sensor C as part of a presentation attack. The face of the user in the 2D photograph J has a 3D pose [r|t] relative to the image sensor C. The image sensor C forms a 2D image I of the 2D photograph J via multiple transformations including: (1) a perspective projection of the 2D photograph J onto a perspective projection plane P, and (2) an affine transformation K by multiplying the perspective projection by a camera intrinsic matrix K for the image sensor C. In one embodiment, one or more components of the facial recognition system 300 (e.g., the calibration unit 410) are configured to determine the camera intrinsic matrix K for the image sensor C by performing a calibration of the image sensor C during the registration phase.

In one embodiment, the 2D image I may be represented in accordance with equation (1) provided below:

$$I = K\pi([r|t]AK'\pi([R|T]S)) \quad (1),$$

wherein $\pi$ is a perspective projection function applied by the image sensor C, and $\pi([r|t]AK')$ is a transformation representing a product of a rigid transformation $[r|t]$ in 3D Euclidean space and an Affine transformation AK in 2D space followed by a perspective projection in accordance with perspective projection function $\pi$. The transformation $\pi([r|t]AK')$ is represented by the shaded region 330 shown in FIG. 5. The transformation $\pi([r|t]AK')$ may be combined into a homography mapping H representing a planar projective transformation, such that the 2D image I may also be represented in accordance with equation (2) provided below:

$$I = KH\pi([R|T]S) \quad (2).$$

In one embodiment, one or more components of the facial recognition system 300 (e.g., the 3D pose and homography optimization 540) is configured to estimate the homography mapping H and the 3D pose [R|T] of the face of the user relative to the image sensor C' using a non-linear optimization approach. Specifically, the facial recognition system 300 first initializes the homography mapping H to an identity matrix representing an identity transform and the 3D pose [R|T] to a frontal 3D pose. The facial recognition system 300 next determines correspondences between detected 2D facial landmark points in the 2D image I and labeled 3D facial landmark points in the 3D shape S. Using the correspondences, the facial recognition system 300 then estimates the homography mapping H and the 3D pose [R|T] by minimizing an error E in accordance with equation (3) provided below:

$$E = \sum_{i=1}^{N} w_i \|K^{-1}L_i^I - H\pi([R|T]L_i^S)\|, \quad (3)$$

wherein $L_i^I$ is a 2D landmark point in the 2D image I, $L_i^S$ is a corresponding labeled 3D landmark point in the 3D shape S, and $w_i$ is a corresponding weight function that is set such that the weight function $w_i$ is inversely proportional to a depth of the labeled 3D landmark point. An example weight function $w_i$ may be represented in accordance with equation (4) provided below:

$$w_i = \frac{\frac{1}{S_i^z}}{\sum_{j=1}^{N} \frac{1}{S_j^z}}, \quad (4)$$

wherein $S_i^z$ is a z-coordinate of an $i^{th}$ labeled 3D landmark point in the 3D shape S.

In one embodiment, one or more components of the facial recognition system 300 (e.g., the distance unit 570 and the comparison unit 580) is configured to detect a presentation attack based on the estimated homography mapping H, the estimated 3D pose [R|T], and the minimized error E. Specifically, the facial recognition system 300 is configured to detect a presentation attack based on: (1) a deviation of an estimated homography mapping H from the identity matrix, and (2) the minimized error E. In one embodiment, a neural network is trained for face liveness detection based on the minimized error E and a deviation of each element of the estimated homography mapping H from the identity matrix.

If there is no spoofing attempt (e.g., no presentation attack) and an object presented to the image sensor C is a real 3D face of the user instead of the 2D photograph J (e.g., the user is standing in front of the image sensor C), the homography mapping H is the same as the identity matrix.

In one embodiment, the facial recognition system 300 may be implemented as an object recognition system configured to recognize and perform liveness detection of different 3D objects (e.g., cars, animals, individuals, etc.).

Figure 6:
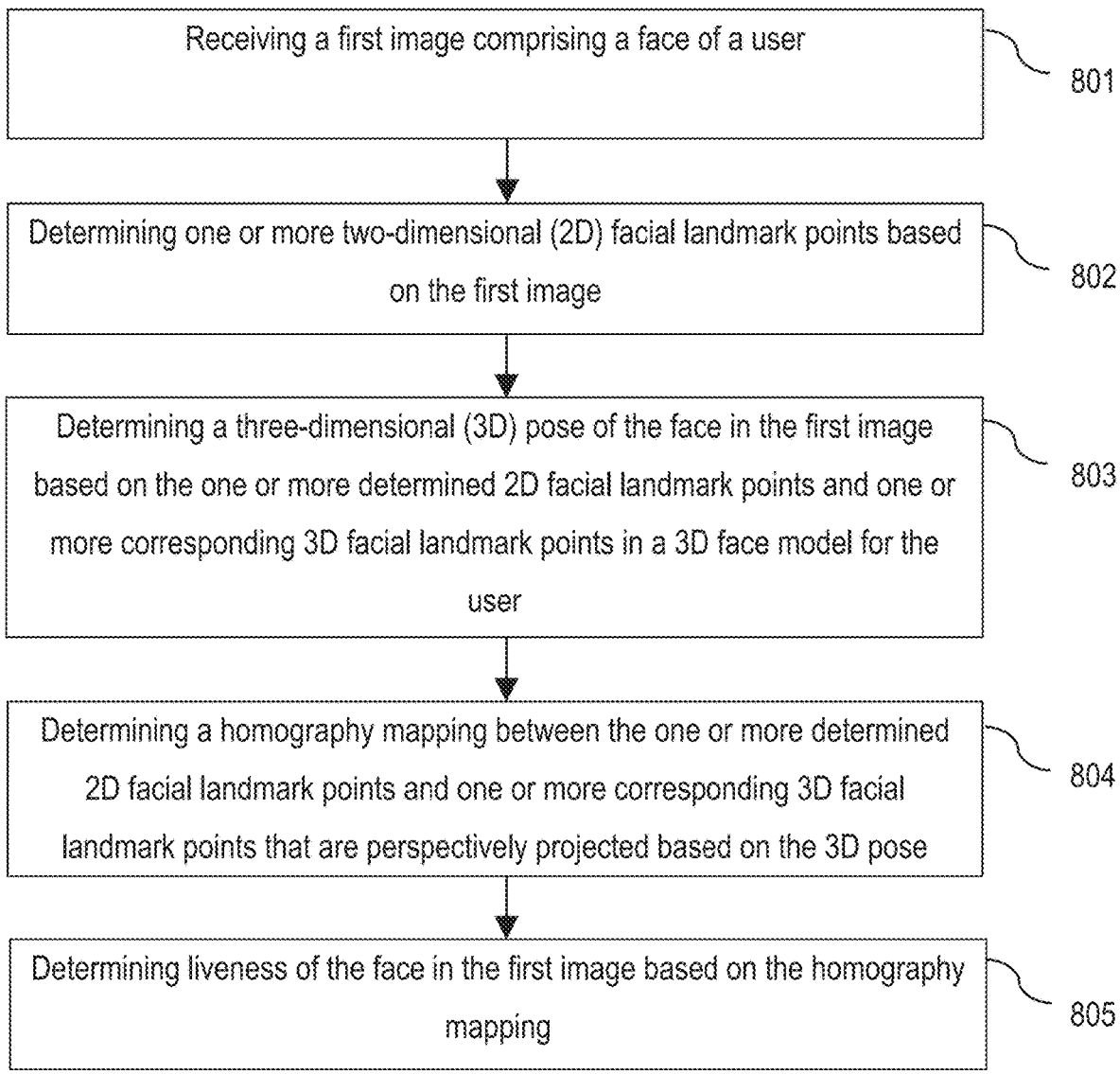
FIG. 6 is a flowchart of an example process for performing face liveness detection to detect a presentation attack, in one or more embodiments.

FIG. 6 is a flowchart of an example process 800 for performing face liveness detection to detect a presentation attack, in one or more embodiments. Process block 801 includes receiving a first image (e.g., query image 515) comprising a face of a user (e.g., as captured by an image sensor 140). Process block 802 includes determining one or more 2D facial landmark points based the first image. Process block 803 includes determining a 3D pose of the face in the first image based on the one or more determined 2D facial landmark points and one or more corresponding 3D facial landmark points in a 3D face model for the user. Process block 804 includes determining a homography mapping between the one or more determined 2D facial landmark points and one or more corresponding 3D facial landmark points that are perspectively projected based on the 3D pose. Process block 805 includes determining liveness of the face in the first image based on the homography mapping (i.e., whether the face in the first image is a real 3D face).

In one embodiment, process blocks 801-805 may be performed by one or more components of the facial recognition system 300, such as the face liveness detection system 320.

Figure 7:
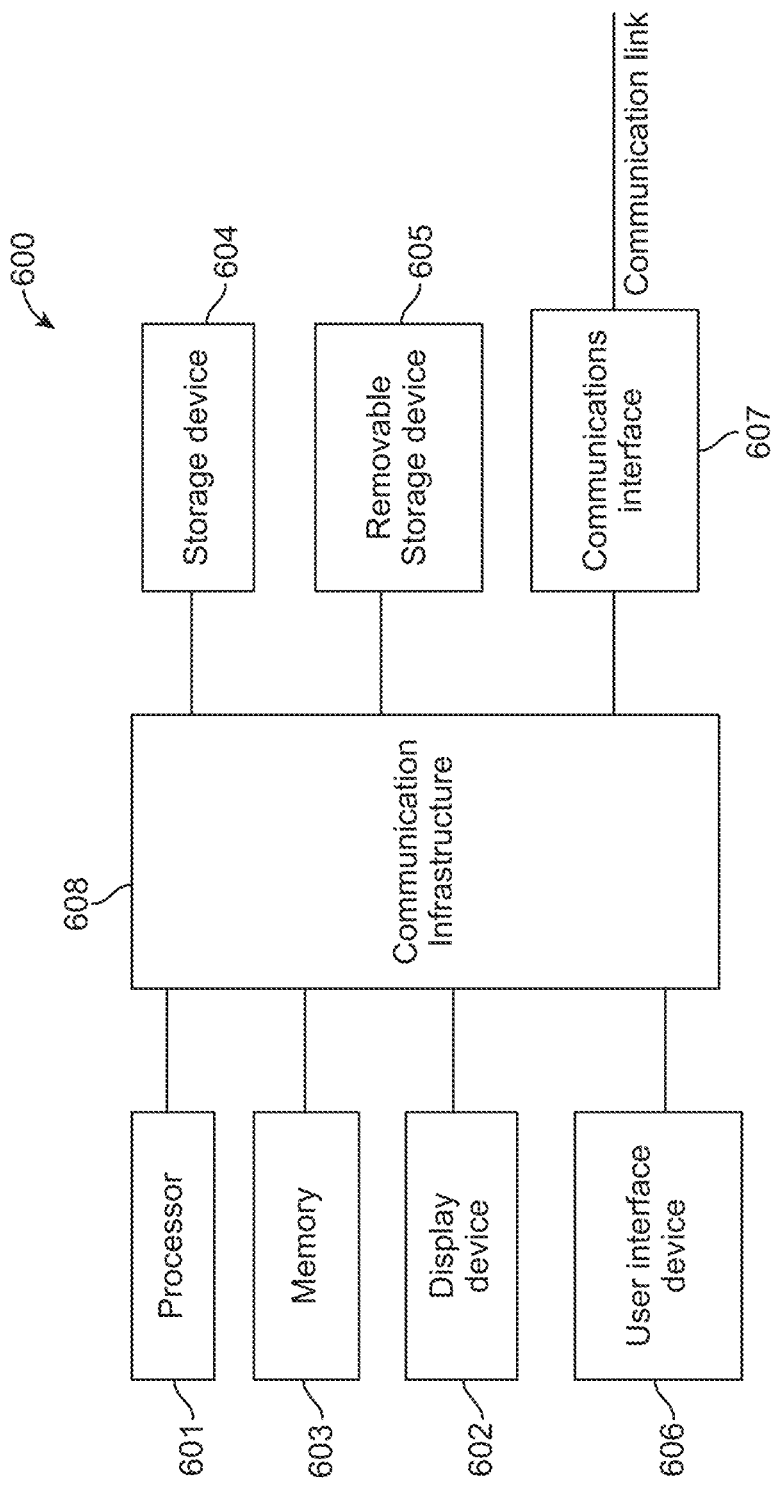
FIG. 7 is a high-level block diagram showing an information processing system comprising a computer system useful for implementing the disclosed embodiments.

FIG. 7 is a high-level block diagram showing an information processing system comprising a computer system 600 useful for implementing the disclosed embodiments. Each system 300, 310, 320 may be incorporated in a display device or a server device. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage device, removable memory module, a magnetic tape drive, optical disk drive, computer readable medium having stored therein computer software and/or data), viewer interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 800 (FIG. 6) may be stored as program instructions on the memory 603, storage device 604, and/or the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof, however, other versions are possible. Therefore, the spirit and scope of the appended claims should not be limited to the description of the preferred versions contained herein.

What is claimed is:

1. A method for face liveness detection, comprising:
   receiving a first image comprising a face of a user;
   determining one or more two-dimensional (2D) facial landmark points based on the first image;
   determining a three-dimensional (3D) pose of the face in the first image based on the one or more 2D facial landmark points and a first set of 3D facial landmark points, wherein the first set comprises one or more 3D facial landmark points in a 3D face model of the face of the user, and the one or more 3D facial landmark points of the first set correspond to the one or more 2D facial landmark points;
   determining a homography mapping between the one or more 2D facial landmark points and a second set of 3D facial landmark points, wherein the second set comprises one or more other 3D facial landmark points that are perspectively projected from the one or more 3D facial landmark points of the first set based on the 3D pose; and
   determining liveness of the face in the first image based on the homography mapping to determine actual presence of the user during capture of the first image.

2. The method of claim 1, further comprising:
   transforming the one or more 2D facial landmark points to one or more other 2D facial landmark points based on one or more parameters of an image sensor that captured the first image to generate a second image including the one or more other 2D facial landmark points;
   wherein the homography mapping is further based on the second image.

3. The method of claim 1, further comprising:
   receiving a request to register a new user, wherein the request comprises multiple facial images of the new user at different poses;
   determining and tracking at least one 2D facial landmark point in the multiple facial images; and
   generating a 3D face model of a face of the new user based on the at least one 2D facial landmark point and one or more parameters of a sensor.

4. The method of claim 1, further comprising:
   refining the 3D pose and the homography mapping to reduce a distance between the one or more 2D facial landmark points and the one or more other 3D facial landmark points of the second set.

5. The method of claim 1, wherein determining liveness of the face in the first image comprises:
   determining a deviation of the homography mapping from an identity matrix to detect whether the face in the first image is one of a 3D face presented to an image sensor that captured the first image or a 2D facial image of the user presented to the image sensor.

6. The method of claim 1, wherein determining a homography mapping comprises decomposing the homography mapping based on one or more parameters of an image sensor that captured the first image.

7. The method of claim 1, further comprising:
   performing facial verification based on the first image to determine the user is a registered user; and
   retrieving the 3D face model of the face of the user in response to determining the user is a registered user.

8. A system for face liveness detection, comprising:
   at least one processor; and
   a non-transitory processor-readable memory device storing instructions that when executed by the at least one processor causes the at least one processor to perform operations including:
   receiving a first image comprising a face of a user;
   determining one or more two-dimensional (2D) facial landmark points based on the first image;
   determining a three-dimensional (3D) pose of the face in the first image based on the one or more 2D facial landmark points and a first set of 3D facial landmark points, wherein the first set comprises one or more 3D facial landmark points in a 3D face model of the face of the user, and the one or more 3D facial landmark points of the first set correspond to the one or more 2D facial landmark points;
   determining a homography mapping between the one or more 2D facial landmark points and a second set of 3D facial landmark points, wherein the second set comprises one or more other 3D facial landmark points that are perspectively projected from the one or more 3D facial landmark points of the first set based on the 3D pose; and
   determining liveness of the face in the first image based on the homography mapping to determine actual presence of the user during capture of the first image.

9. The system of claim 8, wherein the operations further include:
   transforming the one or more 2D facial landmark points to one or more other 2D facial landmark points based on one or more parameters of an image sensor that captured the first image to generate a second image including the one or more other 2D facial landmark points;
   wherein the homography mapping is further based on the second image.

10. The system of claim 8, wherein the operations further include:
    receiving a request to register a new user, wherein the request comprises multiple facial images of the new user at different poses;

determining and tracking at least one 2D facial landmark point in the multiple facial images; and generating a 3D face model of a face of the new user based on the at least one 2D facial landmark point and one or more parameters of a sensor.

11. The system of claim 8, wherein the operations further include:

refining the 3D pose and the homography mapping to reduce a distance between the one or more 2D facial landmark points and the one or more other 3D facial landmark points of the second set.

12. The system of claim 8, wherein determining liveness of the face in the first image comprises:

determining a deviation of the homography mapping from an identity matrix to detect whether the face in the first image is one of a 3D face presented to an image sensor that captured the first image or a 2D facial image of the user presented to the image sensor.

13. The system of claim 8, wherein determining a homography mapping comprises decomposing the homography mapping based on one or more parameters of an image sensor that captured the first image.

14. The system of claim 8, wherein the operations further include:

performing facial verification based on the first image to determine the user is a registered user; and retrieving the 3D face model of the face of the user in response to determining the user is a registered user.

15. A non-transitory computer readable storage medium including instructions to perform a method for face liveness detection, the method comprising:

receiving a first image comprising a face of a user;

determining one or more two-dimensional (2D) facial landmark points based on the first image;

determining a three-dimensional (3D) pose of the face in the first image based on the one or more 2D facial landmark points and a first set of 3D facial landmark points, wherein the first set comprises one or more 3D facial landmark points in a 3D face model of the face of the user, and the one or more 3D facial landmark points of the first set correspond to the one or more 2D facial landmark points;

determining a homography mapping between the one or more 2D facial landmark points and a second set of 3D facial landmark points, wherein the second set comprises one or more other 3D facial landmark points that are perspectively projected from the one or more 3D facial landmark points of the first set based on the 3D pose; and determining liveness of the face in the first image based on the homography mapping to determine actual presence of the user during capture of the first image.

16. The computer readable storage medium of claim 15, wherein the method further comprises:

transforming the one or more 2D facial landmark points to one or more other 2D facial landmark points based on one or more parameters of an image sensor that captured the first image to generate a second image including the one or more other 2D facial landmark points;

wherein the homography mapping is further based on the second image.

17. The computer readable storage medium of claim 15, wherein the method further comprises:

receiving a request to register a new user, wherein the request comprises multiple facial images of the new user at different poses;

determining and tracking at least one 2D facial landmark point in the multiple facial images; and generating a 3D face model of a face of the new user based on the at least one 2D facial landmark point and one or more parameters of a sensor.

18. The computer readable storage medium of claim 15, wherein the method further comprises:

refining the 3D pose and the homography mapping to reduce a distance between the one or more 2D facial landmark points and the one or more other 3D facial landmark points of the second set.

19. The computer readable storage medium of claim 15, wherein determining liveness of the face in the first image comprises:

determining a deviation of the homography mapping from an identity matrix to detect whether the face in the first image is one of a 3D face presented to an image sensor that captured the first image or a 2D facial image of the user presented to the image sensor.

20. The computer readable storage medium of claim 15, wherein determining a homography mapping comprises decomposing the homography mapping based on one or more parameters of an image sensor that captured the first image.

* * * * *